Patented Sept. 28, 1937

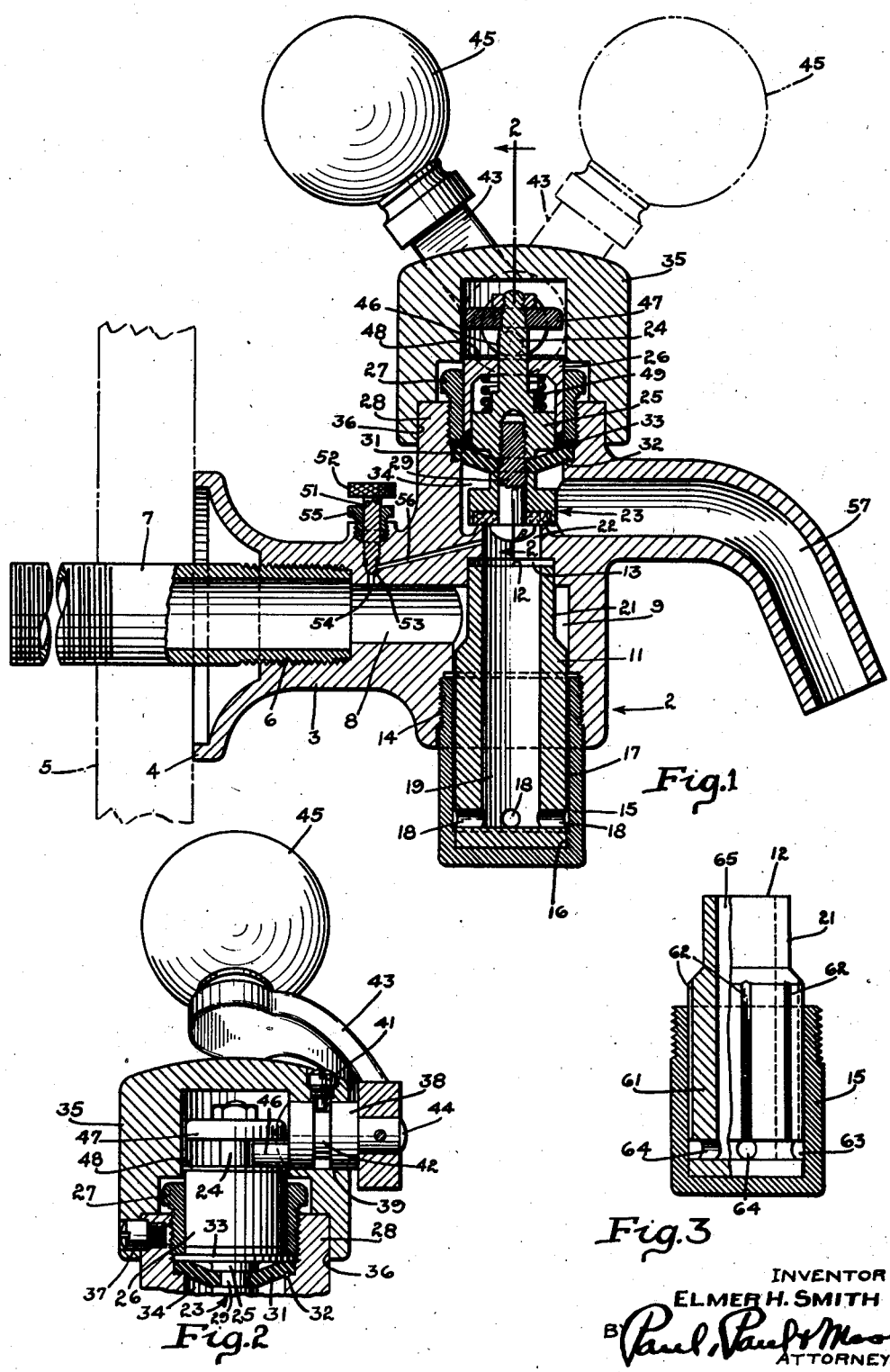

2,094,222

UNITED STATES PATENT OFFICE 2,094,222

BEER FAUCET

Elmer H. Smith, Minneapolis, Minn., assignor to Smith Welding Equipment Corporation, Minneapolis, Minn., a corporation of Delaware Application January 30, 1936, Serial No. 61,552

7 Claims. (Cl. 225—6)

This invention relates to new and useful improvements in apparatus for dispensing gaseous liquids, and more particularly to an apparatus for dispensing beer in small quantities.

The carbon dioxide gas content of beer frequently varies, which directly affects the "wildness" of the beer at a given temperature. Variations in the temperature of the beer may also vary its "wildness", as it is well known that when beer is extremely cold, it may appear relatively flat, when drawn from an ordinary faucet, even though its gas content may be relatively high. On the other hand, if the beer to be dispensed is not so cold, it may be very difficult to dispense from an ordinary faucet without an excessive amount of foam, which always results in waste, and retards the operation of dispensing the beer. Beer is also dispensed at greatly varying pressures in different localities as, for example, in some localities a pressure not exceeding thirty pounds may be adequate for all normal operating conditions, whereas, in other localities a relatively higher pressure may be required. Beer faucets, as now ordinarily constructed, are not adapted for dispensing beer under such varying pressure conditions, and, as a result, are uneconomical, as it is well known that the gas content of beer, and also the pressure at which it is dispensed, greatly affect the foaming characteristics of the beer. It is therefore highly desirable that a faucet be provided which is so constructed that it may be successfully used for dispensing any and all kinds of beer, regardless of the gas content thereof, or the pressure at which it is dispensed, and whereby each glass of beer drawn from the faucet will have just the right amount of foam thereon.

An important object of the invention, therefore, is to provide a beer faucet having means embodied in the construction thereof for controlling and regulating the amount of foam produced on each glass of beer drawn therefrom, regardless of the inherent nature of the beer.

A further object of the invention is to provide a beer faucet having means interposed between its intake and dispensing nozzle for providing a restricted passage to the flow of beer through the faucet, whereby the flow is so throttled that the beer may be dispensed from the faucet without excessive foam, when the faucet is wide open, regardless of the nature of the beer, and said throttling means being interchangeably supported in the faucet whereby each faucet may readily be supplied with a restricted passage of the proper size to best suit the nature or characteristics of the beer to be dispensed therefrom.

A further object is to provide a beer faucet comprising a valve and means independent of the valve for throttling the flow of beer through the faucet, whereby the beer may be dispensed therefrom without excessive foam.

Other objects of the invention reside in the novel means provided in the body of the faucet for throttling the flow of beer from the nozzle, when the valve is wide open, whereby the beer will discharge from the nozzle in a quiet, non-turbulent stream; in the provision of members mounted in the body of the valve and cooperating to provide a restricted passage through which the beer must flow to the nozzle, and which restricted passage throttles the flow of beer, thereby to prevent it from foaming excessively, when discharging from the nozzle; in the sealing means provided above the valve to prevent leakage of beer into the valve operating mechanism; in the means whereby a portion of the beer may be by-passed through a relatively small orifice, at high velocity, directly into the stream of beer entering the nozzle, and without passing through the restricted passage, and whereby the amount of foam produced on the beer in the glass may be controlled; and, in the simple and inexpensive construction of the faucet whereby it may be manufactured at small cost.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a vertical sectional view, showing the general construction of the faucet;

Figure 2 is a detail sectional view on the line 2—2 of Figure 1; and

Figure 3 is a view showing a sleeve of modified construction.

The novel faucet herein disclosed, is shown comprising a body, generally indicated by the numeral 2, having an extension 3 terminating in a flange 4, which may be seated against a suitable support 5, indicated in dotted lines in Figure 1. The extension 3 has a threaded socket 6 adapted to receive one end of a beer supply pipe 7, the opposite end of which is suitably connected to a source of beer under pressure, such as a beer keg or barrel.

The extension 3 has a horizontal passage 8 which communicates with a chamber 9 in the body 2. A sleeve 11 has a reduced upper portion 21 disposed within the chamber 9. The terminal 12 of the sleeve 11 is received in a counterbore 13 provided in the upper wall of the chamber 9. The lower portion of the body 2 has a threaded socket adapted to receive the upper threaded end of a cup-shaped member 15, the bore of which is of substantially the same diameter as the diameter of the chamber 9. The bore of the cup-shaped member 15 is shown slightly smaller at its lower portion, as indicated at 16, to provide a guide for the lower end of the sleeve 11, and whereby the sleeve is retained in concentric relation to the bore of the cup-shaped member 15, thereby to provide an annular restricted passage 17 between the members 11 and 15, as clearly illustrated in Figure 1.

The upper end of the annular passage 17 communicates with the horizontal passage 8 in the extension 3, and the lower end of this annular passage communicates through a series of openings 18, with a central bore 19 provided in the sleeve member 11. The upper end portion 21 of the sleeve 11 is reduced in diameter to provide a passage therearound, which is in direct communication with the horizontal passage 8 and the upper end of the annular restricted passage 17. Thus, the beer delivered to the passage 8 will flow downwardly through the restricted passage 17 and through the openings 18 into the central bore 19, the upper end of which communicates with a valve opening 22, normally closed by a suitable valve, generally indicated by the numeral 23.

The means provided for operating the valve 23 is best shown in Figure 1, and comprises a valve stem 24 having a head 25 at its lower end guidingly supported in a guide member 26 which, in turn, is mounted for relatively vertical movement in a bushing 27, received in threaded engagement with the upper portion 28 of the body 2 of the faucet. The valve 23 is shown secured to the head 25 of the valve stem 24 by a suitable screw 29. A diaphragm 31 has its central portion clamped between the head 25 of the valve stem and the upper end of the valve 23 and the marginal edge of the diaphragm is clamped between a seat 32 in the valve body 2 and a suitable stop washer 33, against which the lower end of the bushing 27 is seated. By thus securing the marginal edge of the diaphragm to the seat 32, and its central portion between the valve 23 and the head 25, leakage from the valve chamber 34 into the upper portion of the valve is positively eliminated, as will readily be understood by reference to Figure 1.

A cap 35 encloses the operating mechanism of the valve 23, and has a bore 36 at its lower end into which the upper portion 28 of the body 2 is fitted. A suitable lock screw 37 secures the cap 35 to the body, as will readily be understood by reference to Figure 2.

A suitable rock shaft 38 is rotatably supported in a suitable bearing 39 in the cap 35, and is retained in said bearing by a retaining screw 41, the lower terminal of which is received in an annular groove 42 provided in the periphery of the rock shaft 38. An operating lever 43 is secured to the reduced terminal 44 of the rock shaft 38 and has a suitable hand grip 45.

A crank pin 46 is secured to the rock shaft 38 and is received between the upper end of the guide member 26 and a disk 47 secured to the upper end of the valve stem 24, as clearly illustrated in Figure 1. A wear plate 48 is shown seated upon the upper end of the guide member 26. A suitable spring 49 is shown coiled about the valve stem 24, and has its lower end seated against the head 25 and its upper end against the guide member 26, whereby a force is constantly exerted between the head 25 and member 26 to move them in opposite directions, as will be clearly understood by reference to Figure 1. The spring 49 serves to resiliently hold the valve 23 on its seat against the pressure of the liquid in the central passage 19, it being understood that the pressure exerted against the valve by the spring 49 is relatively greater than the maximum pressure exerted against the bottom of the valve 23 by the liquid in the central passage 19.

Means is provided for controlling the amount of foam produced on each glass of beer drawn from the faucet. Such a means is shown in Figure 1, and comprises a suitable needle valve 51 provided with a knurled head 52 and having a cone-shaped terminal 53 adapted to close a small orifice 54, one end of which communicates with the horizontal passage 8 of the faucet body. A suitable packing nut 55 prevents leakage of the beer around the needle valve 51. A small by-pass or orifice 56 connects the passage 54 with the upper end of the central passage 19, directly beneath the valve 23, when the needle valve 51 is open. The needle valve 51 thus provides means whereby a portion of the beer may be by-passed directly from the supply pipe 7 into the upper end of the central passage 19, without passing through the annular restricted passage 17. The beer which is thus by-passed, enters the passage 19 at high velocity, whereby it is agitated sufficiently to cause it to foam as it discharges into the passage 19 from the orifice 56, when the valve 23 is open. When the valve is closed, the flow of beer through the by-pass 56 is, of course, interrupted.

In actual operation, it has been found that by the provision of the needle valve 51, the faucet may be quickly adapted for dispensing beer, whether under high or low pressure, or whether it has a high or low carbon dioxide content. For example, when beer is extremely cold, it has less tendency to foam, and when such beer is dispensed through the novel faucet herein disclosed, the needle valve 51 is opened, whereby a portion of the beer passes through the by-pass 56 into the beer stream delivered to the nozzle 57 from the passage 19, each time the valve 23 is opened. Thus, by proper adjustment of the needle valve 51, the beer delivered into the glass will contain the proper amount of foam. On the other hand, should the beer be relatively warmer, or have a relatively higher gas content, it may be found desirable to completely close the by-pass 56, whereupon all the beer must flow through the restricted passage 17 to the nozzle 57, which restricted passage will throttle the flow of the beer sufficiently to prevent it from foaming excessively, when dispensed into a glass. Thus, it will be seen that the needle valve 51 provides means whereby the beer faucet may be quickly adapted for dispensing any kind of beer, without waste, regardless of the nature thereof.

In use, the faucet is connected to a keg or barrel by means of the pipe 7, and air under pressure is then introduced into the barrel by suitable means, such as a compressor, thereby to force the beer up through the pipe 7 to the faucet in the usual manner. The beer thus delivered into the passage 8 of the faucet, will flow through the annular restricted passage 17, into the central passage 19, the valve 23 normally preventing the beer from flowing through the valve opening 22 into the nozzle 57, which is in direct communication with the valve chamber 34.

When it is desired to draw a glass of beer from the faucet, the operating lever 43 is moved to the dotted line position, indicated in Figure 1, whereby the valve 23 is unseated, thereby permitting the beer in the central passage 19 to flow into the nozzle 57, from whence it is precipitated into the glass. Because of the restricted passage 17, the beer under pressure in the supply pipe 7 is throttled in its flow from the horizontal passage 8 to the central passage 19, whereby it will flow from the nozzle in a quiet, non-turbulent stream, and without excessive foam. This results because the velocity of the beer through the central passage 19 is greatly reduced, as a result of the beer flowing through the restricted passage 17 whereby, even though the beer in the keg may be under relatively high pressure as, for example 25 to 30 pounds, the beer may be drawn from the faucet without foaming excessively.

Should the beer in the keg be found to be so flat that it will not produce sufficient foam on the beer in the glass, when the faucet is operated in the normal way, then the beer may usually be caused to foam sufficiently by only slightly opening or cracking the valve 23, whereby the pressure on the beer in the central passage 19 will cause it to discharge through the slightly open valve at high velocity, resulting in turbulence and agitation, and in most cases, excessive foaming. It is to be understood that when the valve 23 is only slightly opened, whereby the flow of beer therethrough is restricted, the beer in the central passage 19 will be under substantially the same pressure as the beer in the horizontal passage 8, thereby causing the beer to be forced through the small opening in the valve at high velocity. When the valve is moved to full opening, as when normally operated, the beer in the central chamber 19, which may be under substantially the same pressure as the beer in the feed pipe 7, will suddenly expand into the nozzle 57, after which the beer will flow from the restricted passage 17, through the passage 19, into the nozzle 57, in a quiet, non-turbulent stream, as a direct result of the throttling action of the restricted passage 17 on the flow of beer thereto.

The novel faucet herein disclosed, is extremely simple in construction and readily lends itself to quantity production. It is substantially leak-proof in operation and may be operated in substantially the same manner as an ordinary faucet. The valve 23 is retained on its seat by the action of the spring 49, as it will be noted that there is a slight gap between the upper portion of the crank pin 46 and the disk 47 provided at the upper end of the valve stem. When the operating lever 43 is operated to open the valve, the crank pin will engage the disk 47 and thus lift the valve 23 from its seat, it being understood that the cup-shaped guide 26 moves upwardly, together with the valve stem 24, because of the spring 49. When the operating lever 43 is in its normal closed position, as shown in Figure 1, the crank pin 46 will bear against the wear plate 48, seated on the upper end of the cup-shaped guide 26, which guide, in the present instance, provides a limit stop for the closed position of the operating lever 43. It is to be understood that when the lever reaches the position shown in full lines in Figure 1, the lower end of the cup-shaped guide 26 will be resting upon or abuttingly engaging the stop collar or washer 33, whereby the guide 26 is prevented from further downward movement. When the guide 26 thus engages the stop collar 33, the spring 49 will hold the valve 23 in leak-proof engagement with its seat.

The operating mechanism of the valve 23 may be readily disassembled for inspection or repairs by simply removing the retaining screw 41, after which the operating lever 43 and rock shaft 38 may be removed from the cap 35. The retaining screw 37 of the cap 35 is then removed, whereby the cap may be lifted from the upper portion 28 of the valve body, thereby exposing the upper end of the valve stem 24 and guide 26. By unscrewing the bushing 27, the entire valve assembly may be removed from the valve body.

The sleeve 11, shown in Figure 1, as previously stated, is removably supported in the body 2 of the faucet by the cap 15. This provides an important feature of the apparatus in that it makes it possible to vary the restricted passage 17, through which the beer must flow from the passage 8 to the central passage 19, and which is provided between the periphery of the sleeve 11 and the bore of the cup-shaped member 15. For example, when dispensing beer which may be under relatively high pressure at its source, it may be found more desirable to reduce the restricted passage 17 in size for the purpose of increasing the throttling action on the beer flowing therethrough. On the other hand, if the beer to be dispensed is extremely cold, or has a relatively lower pressure at its source, a restricted passage 17 of greater capacity may be more desirable. The sleeve 11 therefore may be furnished in different sizes whereby the faucet may be quickly adapted for dispensing different kinds of beer whose gas content, or state of "wildness" may vary considerably, by simply inserting a sleeve 11 which will produce a restricted passage 17 more suitable therefor.

In Figure 3, there is illustrated a sleeve 61 of slightly modified construction having a plurality of longitudinally extending grooves 62 provided in its periphery, the upper ends of which are adapted to communicate with the chamber 9, and their lower end with an annular recess 63 provided in the lower portion of the body of the sleeve. Suitable apertures 64 establish communication between the recess 63 and the bore 65 of the sleeve in substantially the manner shown in Figure 1. In the construction shown in Figure 3, the diameter of the main body of the sleeve 61 corresponds substantially to the bore of the cup-shaped member 15, as clearly illustrated, whereby the beer will flow from the passage 8 downwardly through the grooves 62 to the recess 63. The grooves 62 cooperate to provide a restricted passage for the beer in its flow from the passage 8 to the interior of the sleeve, in substantially the same manner as the annular restricted passage 17, shown in Figure 1. By varying the size of the grooves 62 or their number, or both the size and number thereof, the flow of beer from the passage 8 to the interior of the sleeve may be varied to suit the particular characteristics of the beer being dispensed which, as hereinbefore stated, provides an important feature of the present invention.

I claim as my invention:

1. A beer faucet comprising a body having a passage adapted for connection to a beer supply under pressure, a dispensing nozzle, cooperating members in said body providing a restricted passage having a connection with said supply passage, a control valve for connecting the nozzle to the restricted passage, said restricted passage operating to throttle the flow of beer from the passage to the nozzle, when the valve is open whereby the beer may be drawn into a glass without excessive foaming, and a relatively small by-pass having independent means for controlling flow therethrough, whereby a portion of the beer may be drawn from the supply passage directly into the nozzle at high velocity, thereby to regulate the amount of foam produced on the beer in the glass, said by-pass being located in said valve body remote from said cooperating members.

2. A beer faucet comprising a body having a beer supply pipe connected thereto, a dispensing nozzle, a tubular member removably mounted in said body, a valve for connecting the interior of said member to the nozzle, and a member cooperating with said tubular member to provide an annular restricted passage through which the beer must flow from the passage to the nozzle, when the valve is open, and whereby the flow of beer is throttled to prevent excessive foaming.

3. A beer faucet comprising a body, a pipe connecting said body to a beer supply under pressure, a dispensing nozzle, a cylindrical sleeve mounted in the valve body and having a passage therein, a valve for connecting said passage to the nozzle, a cup-shaped member fitting over the sleeve and cooperating therewith to provide a restricted passage through which the beer must flow from the supply pipe to the nozzle when the valve is open, and whereby the flow of beer from the faucet is throttled to prevent excessive foaming, and a small orifice through which a portion of the beer may flow at high velocity from the supply pipe to the nozzle when the valve is open, thereby to control the amount of foam produced on the dispensed beer.

4. A beer faucet comprising a body, a pipe connecting said body to a beer supply under pressure, a dispensing nozzle, a sleeve mounted within said body and having a central passage therein, a manually operable valve for controlling the flow of beer from said passage to the nozzle, a cup-shaped member secured to said body and cooperating with said sleeve to provide an annular restricted passage, one end of which communicates with the beer supply pipe and the other with said central passage, and through which the beer must flow, when the valve is open, said restricted passage checking the flow of beer from the nozzle to prevent excessive foaming.

5. A beer faucet comprising a body, a pipe connecting said body to a beer supply under pressure, a dispensing nozzle, said body having a chamber therein, a sleeve disposed in said chamber and having a central passage, a manually operable valve for controlling the flow of liquid from said central passage to the nozzle, a cup-shaped member having one end secured to said body and having its opposite end enclosing the adjacent end of the sleeve, the bore of said cup-shaped member being slightly larger than the diameter of the sleeve thereby to provide an annular restricted passage, one end of which communicates with the beer supply pipe and the other with said central passage, and through which the beer must flow to the nozzle, when the valve is open, said restricted passage throttling the flow of beer to prevent excessive foaming.

6. A beer faucet comprising a body having a passage therein adapted for connection to a beer supply under pressure, a dispensing nozzle, a valve chamber between said passage and the nozzle having a valve seat therein, a valve engageable with said seat to close the valve opening, a stem secured to the valve, a guide for said stem mounted for axial movement, a spring interposed between said guide and the valve stem, a crank pin engageable with said guide and with means on the valve stem whereby, when moved in one direction, the valve is seated, and when moved in the opposite direction, the valve is unseated, a stop for limiting downward movement of the guide, and whereby movement of the crank in one direction is also limited, said stop being so related to the valve seat that when the guide is at the limit of its downward movement, the spring will hold the valve on its seat.

7. A beer faucet comprising a body having a passage therein adapted for connection to a beer supply under pressure, a dispensing nozzle, a valve chamber between said passage and the nozzle having a valve seat therein, a valve engageable with said seat to close the valve opening, a stem secured to the valve, a diaphragm secured to the valve and constituting the upper wall of the valve chamber, a guide for said stem mounted for axial movement, a spring interposed between said guide and the valve stem, a crank pin engageable with said guide and with means on the valve stem whereby when moved in one direction the valve is seated and when moved in the opposite direction the valve is unseated, a stop for limiting downward movement of the guide whereby movement of the crank in one direction is also limited, said stop being so related to the valve seat that when the guide is at the limit of its downward movement the spring will hold the valve on its seat.

ELMER H. SMITH.